(12) United States Patent
Li et al.

(10) Patent No.: US 11,475,598 B2
(45) Date of Patent: Oct. 18, 2022

(54) UNIVERSAL COLOR CODING SYSTEM, AND METHOD OF ANALYZING OBJECTS WITH MULTIPLE ATTRIBUTES USING THE COLOR CODING SYSTEM

(71) Applicant: City University of Hong Kong, Kowloon (HK)

(72) Inventors: Han-Lin Li, Kowloon (HK); Way Kuo, Kowloon (HK)

(73) Assignee: City University of Hong Kong, Kowloon (HK)

( * ) Notice: Subject to any disclaimer, the term of this patent is extended or adjusted under 35 U.S.C. 154(b) by 62 days.

(21) Appl. No.: 17/126,225

(22) Filed: Dec. 18, 2020

(65) Prior Publication Data

US 2021/0192790 A1    Jun. 24, 2021

Related U.S. Application Data

(63) Continuation-in-part of application No. 16/720,228, filed on Dec. 19, 2019, now Pat. No. 11,140,298.

(51) Int. Cl.
| | |
|---|---|
| *G06T 9/00* | (2006.01) |
| *G06T 7/90* | (2017.01) |
| *G06T 11/00* | (2006.01) |
| *G06T 7/00* | (2017.01) |

(52) U.S. Cl.
CPC .............. *G06T 7/90* (2017.01); *G06T 7/0012* (2013.01); *G06T 11/001* (2013.01); *G06T 2207/10024* (2013.01); *G06T 2207/30072* (2013.01)

(58) Field of Classification Search
CPC .......... G06T 7/90; G06T 7/0012; G06T 9/00; G06T 2219/2012; G06T 2207/10024
USPC ................................ 358/520, 523, 524, 539
See application file for complete search history.

(56) References Cited

U.S. PATENT DOCUMENTS

| | | | |
|---|---|---|---|
| 2014/0263668 A1* | 9/2014 | Mesh-Iliescu | ..... G06K 19/0614 235/494 |
| 2014/0267369 A1* | 9/2014 | Mesh-Iliescu | ....... H04N 19/895 345/600 |

* cited by examiner

*Primary Examiner* — Jamares Q Washington
(74) *Attorney, Agent, or Firm* — Renner Kenner Greive Bobak Taylor & Weber

(57) ABSTRACT

A universal color coding system, and method of analyzing objects with multiple attributes using the color coding system. The color coding system includes a color mapper arranged to map a plurality of colors with a plurality of numerical codes, wherein the each of the plurality of numerical codes is a unique integer determined based on a combination of prime numbers; wherein each of the plurality of numerical codes is arranged to represent a unique color in color space wherein each of the prime numbers represents a respective basic color of the color space; and wherein the plurality of numerical codes are integers calculated based on addition and multiplication of a plurality of prime numbers.

24 Claims, 8 Drawing Sheets
(7 of 8 Drawing Sheet(s) Filed in Color)

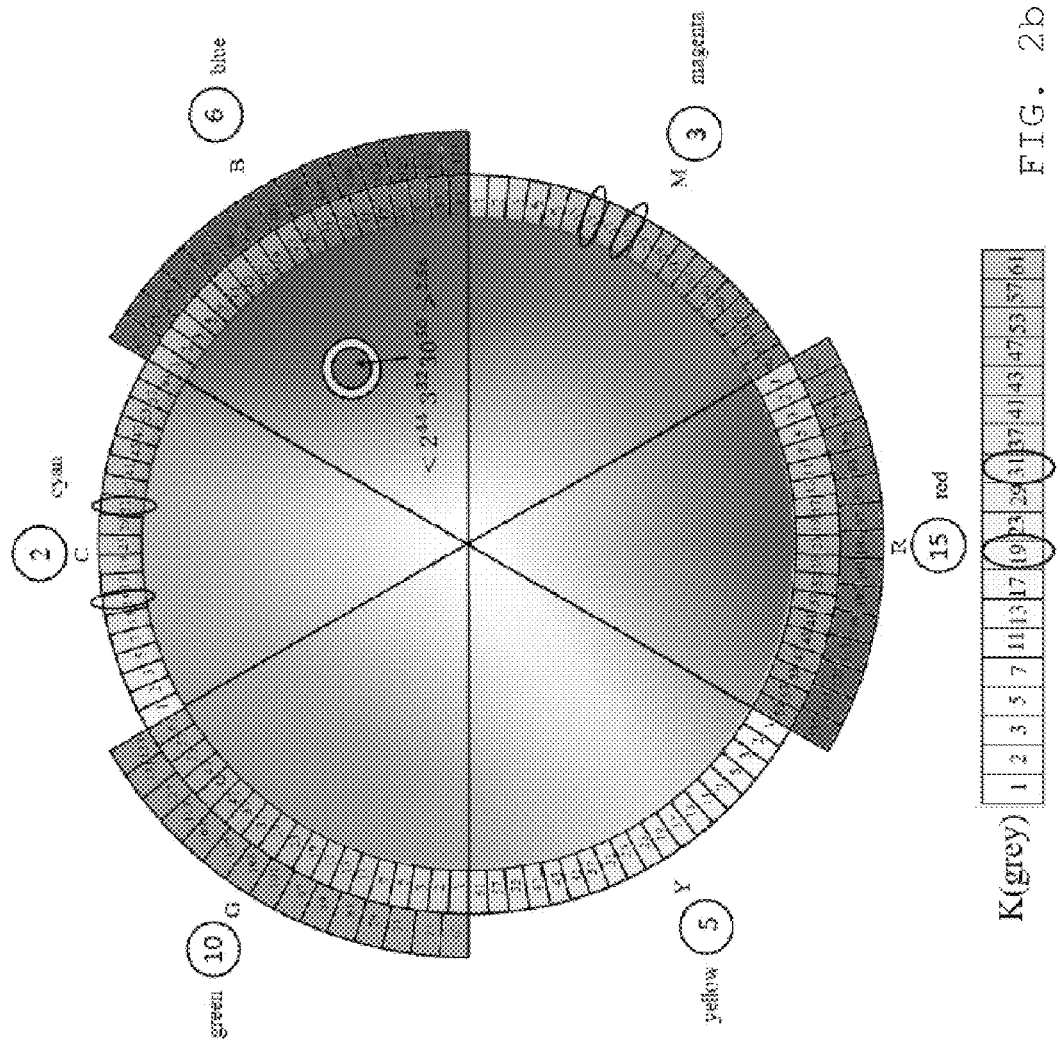

UNIVERSAL COLOR CODING SYSTEM, AND METHOD OF ANALYZING OBJECTS WITH MULTIPLE ATTRIBUTES USING THE COLOR CODING SYSTEM

TECHNICAL FIELD

The present invention relates to a universal color coding system, and particularly, although not exclusively, to a color coding system based on prime numbers for easy color manipulations.

BACKGROUND

Color may be considered as a physical property of an object or even energy with respect to a wavelength of light reflected by the object or substance, or emitted from a light source. Color of light has a direct relation with the wavelength of the electromagnetic (EM) wave, for example, in the visible light spectrum, red light generally refers to EM wave with wavelength close to the spectrum at around 650 nm, whereas blue/violet light generally refers to the 400 nm end.

A color may also be specified based on attributes such as hue, saturation, brightness or a combination of basic colors in a color representation or color space. In an example color representation, a color may be represented by a coordinate of a point on a color graph. Alternatively, a color may be specified based on intensity or "amount" of each of the basic colors in a color space which combine to form such a color.

SUMMARY OF THE INVENTION

There are two aspects of the present invention, the first one is a universal color coding system based on prime numbers, and the second one is a method of analyzing objects with multiple attributes using the color coding system of the first aspect.

In accordance with a first aspect of the present invention, there is provided a color coding system comprising a color mapper arranged to map a plurality of colors with a plurality of numerical codes, wherein the each of the plurality of numerical codes is a unique integer determined based on a combination of prime numbers; wherein each of the plurality of numerical codes is arranged to represent a unique color in a color space wherein each of the prime numbers represents a respective basic color of the color space; and wherein the plurality of numerical codes are integers calculated based on addition and multiplication of a plurality of prime numbers.

In an embodiment of the first aspect, the plurality of numerical codes are integers calculated based on Goldbach conjecture.

In an embodiment of the first aspect, the color space is CMYK, and the basic colors are cyan, magenta and yellow.

In an embodiment of the first aspect, the basic colors of cyan, magenta and yellow are represented by prime numbers of 2, 3 and 5 respectively.

In an embodiment of the first aspect, a unique color (i) is expressed as Color $(i) = <2^{c_i} 3^{m_i} 5^{y_i}>^{2.56}$, wherein the color (i) has CMYK values of ($c_i$, $m_i$, $y_i$, $k_i$).

In an embodiment of the first aspect, the colors of blue, green and red are represented by 6, 10 and 15 respectively, and wherein the colors of blue, green and red are obtained by respectively mixing of: cyan and magenta, cyan and yellow, and magenta and yellow. Moreover, the colors of cyan-blue, blue-magenta, magenta-red, red-yellow, yellow-green, and green-cyan are represented respectively by 12, 18, 45, 75 50 and 20.

In an embodiment of the first aspect, a unique color (i) is expressed as Color$(i) = 2^{256-r_i} 3^{256-g_i} 5^{256-b_i}$, wherein the color (i) has RGB values of ($r_i$, $g_i$, $b_i$).

In an embodiment of the first aspect, the integer representing the unique color (i) is specified as Number$(i) = 256^2 r_i + 256 g_i + b_i$, where $r_i$, $g_i$, $b_i \in \{0, 1, 2, 3, \ldots, 255\}$.

In an embodiment of the first aspect, each of $r_i$, $g_i$ and $b_i$ is a sum of two prime numbers if it is an even number.

In an embodiment of the first aspect, $r_i = \theta_{i1} + d_{i1} + d_{i2}$, $g_i = \theta_{i2} + d_{i3} + d_{i4}$, $b_i = \theta_{i3} + d_{i5} + d_{i6}$, in which $d_{i1}$, $d_{i2}$, $d_{i3}$, $d_{i4}$, $d_{i5}$, $d_{i6} \in \rho^{**}$ representing a set of first 33 prime numbers, and $\theta_{i1}$, $\theta_{i2}$, $\theta_{i3}$ are binary variable to specify whether $r_i$, $g_i$ and $b_i$ are even or odd.

In an embodiment of the first aspect, each prime number $d_{il}$ for $l=1, 2, \ldots, 6$ is regarded as a key color.

In an embodiment of the first aspect, a color palette is generated based on the color mapper, the color palette is arranged to represent a plurality of mergers of basic color blocks of cyan, magenta, yellow and/or blue, green and red.

In an embodiment of the first aspect, the color palette comprises 72 CMYK key color blocks represented by 4 groups of key colors corresponding to 18 prime numbers.

In an embodiment of the first aspect, the 72 CMYK key color blocks are arranged to generate $100^3$ unique colors in the CMYK color space.

In an embodiment of the first aspect, the color palette comprises 99 RGB key color blocks represented by 3 groups of key colors corresponding to 33 prime numbers.

In an embodiment of the first aspect, the 99 RGB key color blocks are arranged to generate $256^3$ unique colors in the RGB color space.

In accordance with a second aspect of the present invention, there is provided a method of analyzing objects with multiple attributes using the color coding system in accordance with the first aspect, the method comprising the steps of: assigning a unique color for each of a plurality of attributes of the object; associating a level of each of the plurality of attributes to an intensity of the unique color; allocating the object on the color palette; and rendering the color spot representing the object on the color palette.

In an embodiment of the second aspect, the method further comprises the step of determining at least one relationship among a plurality of objects represented by a plurality of color spots on the color palette.

In an embodiment of the second aspect, the at least one relationship includes a complementary relationship of the compared objects indicated by complementary colors on the color palette.

In an embodiment of the second aspect, the at least one relationship includes an approximate relationship of the compared objects indicated by monochromatic colors on the color palette.

The second aspect can be applied to various objects with multiple attributes. In an embodiment of the second aspect, the objects includes DNA, wherein the attributes includes protein-binding sites of the DNA.

In an embodiment of the second aspect, the method further comprises the step of predicting attributes of a resultant object obtained by mixing or combining multiple objects allocated on the color palette.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present invention will now be described, by way of example, with reference to the accompanying drawings in which:

FIGS. 2a and 2b are illustrations of a $C_{235}$ color palette generated by the color coding system in accordance with an embodiment of the present invention, in which a resulting color is obtained by merging three unique colors;

DETAILED DESCRIPTION OF THE PREFERRED EMBODIMENT

Figure 1:
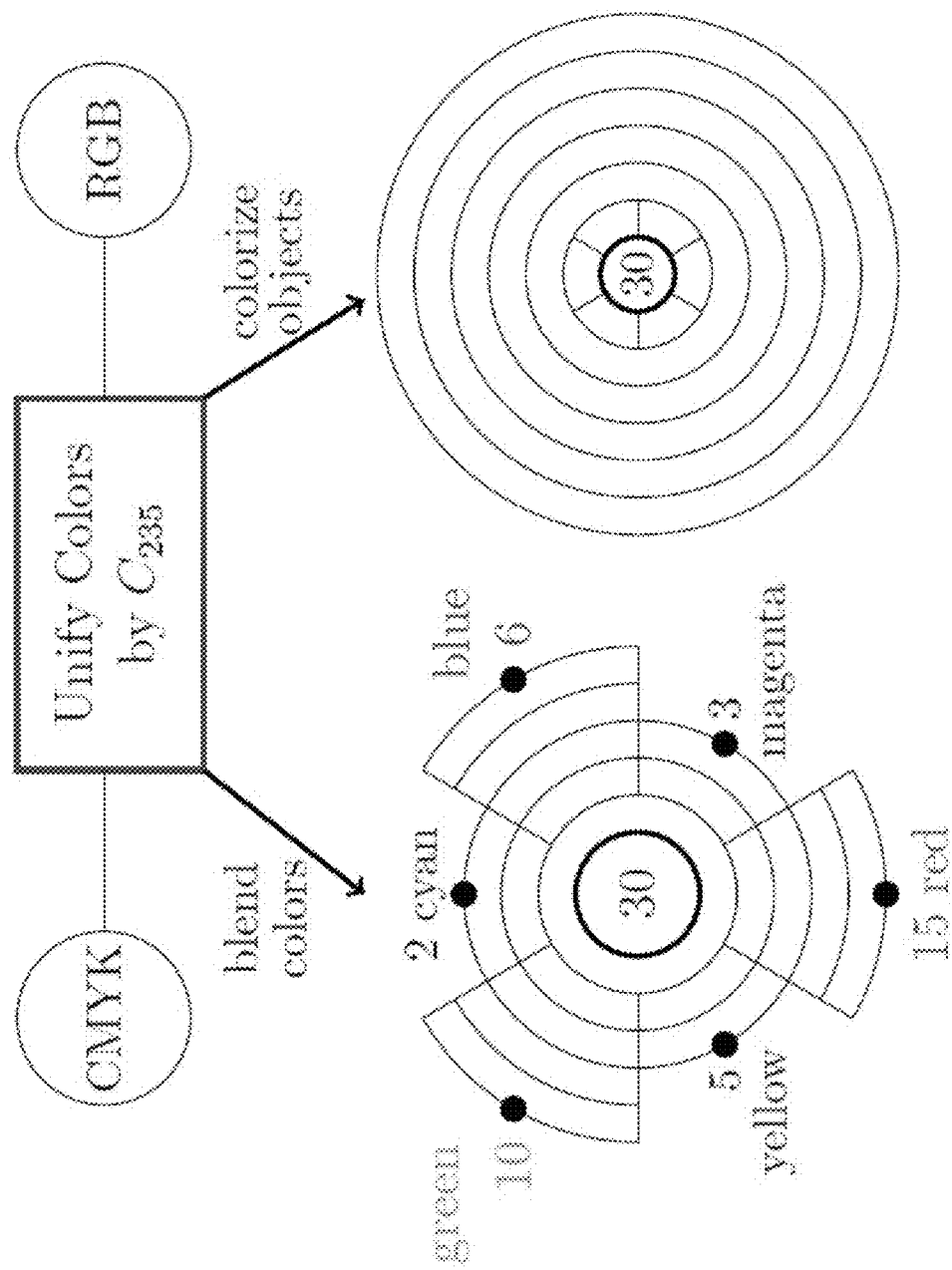
FIG. 1 is an illustration of the color coding system in accordance with an embodiment of the present invention, the color coding system includes a color palette of blending colors and a color ring for colorizing objects which unifies colors in both the RGB space and the CMYK space.

The inventors have, through their own research, trials and experiments, devised that color coding methods such as RGB, CMYK, and HSV color methods may be used in different applications. However, owing lack powerful integration frame, these methods may be difficult in some applications. For example, it may be difficult to: i) treating overflow problems happen frequently in blending colors; ii) convert a RGB color into a unique CYMK color; iii) blend multiple colors to paint a coloured object; or iv) using less number of key colors to express CMYK and RGB colors on a compact palette.

According to Issac Newton's theory of light, it is described that all colors can be generated from three basic colors red, green, and blue, based on this, RGB and CMYK may be the most popular color systems, whereas other systems such as HSV may be derived from RGB and CMYK.

In the above mentioned examples, RGB is a color-light structure and CMYK is a color pigment structure. However, owing to the lack of a universal frame to encode colors, RGB, CMYK, and HSV are weak in connecting and blending colors with each other. It is preferable that a universal color codes system may be used to unify different color systems.

In some example color systems, the color codes and color conversions may be specified as follows.

In a RGB system, each of R(red), G(green), B(blue) colors has 256 values expressed as [0, 1, 2, . . . , 255], and is coded as (r, g, b).

In a CMYK system, each of C(Cyan), M(Magenta), Y(Yellow), K(Gray) has 100 levels expressed as [0%, 1%, 2%, . . . , 99%] and is coded as (c, m, y, k).

In a HSV system, H(hue) has 360 degrees expressed as [0°, 1°, . . . , 360°], both S(saturation) and V(value) have 100 levels expressed as [0%, 1%, . . . , 100%].

An RGB system contains 3×256 key colors, while a CMYK-system contains 4×100 key colors. The inventors devised that the amount of these key colors may be too big to be manipulated effectively, which may prohibit a user to predict the outcome color after blending various key colors. It may be preferable to design a compact palette, which able to generate all colors via tempering smaller number of key colors.

Moreover, current CMYK and RGB systems are difficult to treat overflow problems happen frequently in blending colors. For instance, if there are two colors i and j expressed in CMYK as color(i)=(90, 50, 0, 0) and color (j)=(80, 30, 0, 0). Then the merger of color(i) and color(j) becomes (170, 80, 0, 0). However, since 170 is over 100, (170, 80, 0, 0) is an illegal expression in CMYK. The same overflow expression problems may also happen in RGB, and have not yet been treated well in current CMYK and RGB systems.

In addition, in some example applications, various objects, such as people, goods, musics, and even DNA may be represented by numbers and colors. For example, the former can quantify objects and the latter can visualize objects. The objects of a given set is normally expressed in multiple attributes, where each attribute contains some values. In one example embodiment, a set of objects with multiple attributes may be numberize and then colorize, thus the relationships among objects on a color ring may be visualized.

The inventors devised that prime numbers are the roots of integers, in addition, prime number theory and Goldbach conjecture may be two fundamental ways to link nature numbers with prime numbers. In particular, prime number theory claims that any natural number larger than 1 can be expressed uniquely as the product of some prime numbers. Goldbach conjecture claims that any even number larger than 2 can be expressed as the sum of two prime numbers.

From prime number theory and Goldbach conjecture, there is provided an embodiment of a new color system, in which the inventors called it "$C_{235}$ color system". Preferably, $C_{235}$ may be used to encode, unify and blend colors and to colorize objects. With reference to FIG. 1, there is shown an embodiment of the $C_{235}$ system, in which:

(i) $C_{235}$ uses 2, 3, and 5 to represent color blocks cyan, magenta, and yellow, respectively. Then, it uses 6, 10, 15, and 30 to represent blue, red, green, and gray, respectively. Moreover, $C_{235}$ can use 12, 18, 45, 75, 50 and 20 to represent respectively cyan-blue, blue-magenta, magenta-red, red-yellow, yellow-green and green-cyan. In this example, $C_{235}$ may be used to unify colors in RGB, CMYK, and HSV, where each color has a universal code valuable for conversion, computing and display of colors.

(ii) Utilizing Goldbach conjecture, $C_{235}$ may use no more than 6 prime numbers to express any natural number less than $256^3$. In this example, each prime number may be assigned a "seed color". Preferably, by assigning a prime number a key color, each of $256^3$ colors may be represented as the combination of six key colors on $C_{235}$ palette.

(iii) By making three color blocks 2, 3 and 5 equidistantly on a circle, an initial round may be formed. By allocating six color blocks $2^2$; 6; $3^2$; 15; $5^2$, and 10 equidistantly on a circle, the second round may be formed. In a similar way, using 2, 3 and 5 can represent up to $256^3$ color blocks and form a $C_{235}$ Ring. Preferably, for a set of objects with multiple attributes, each object may be assigned with a unique number and an associated color. Advantageously, the relationships among objects, such as complementary and monotonic can then be visualized.

(iv) In addition, many objects with multiple attributes can also be colorized and allocated on a $C_{235}$ Ring.

As described above, RGB and CMYK may be two of the most popular color codes used in example applications such as industries of paint, printing, arts, fashion, and coating. Occasionally, various colors in different codes require being converted from or blended with each other, e.g. it may be necessary to print out an apple on screen by a CMYK printer, or it may be necessary to predict the resulting color of an apple, if a blue light is used to irradiate the apple.

However, RGB and CMYK, as well as other color codes such as HSV, are designed for various specific conditions and application ends. Preferably, a universal color encoding and computing relationship may be used to bridge various popular color codes, or to colorize objects.

In one example embodiment, a current commonly used color conversion formula between RGB and CMYK is represented as:

$$r=255(1-c/100)(1-k/100),$$

$$g=255(1-m/100)(1-k/100),$$

$$b=255(1-y/100)(1-k/100).$$   Expression (1):

There may be deficiencies of these example color systems. Firstly, unique conversion of the color may be difficult. Different colors in a system may be converted into the same color of another system. For instance, consider Color A, Color B, and Color C in CMYK system, where $(c_A, m_A, y_A, k_A)=(56\ 28\ 28\ 0)$, $(c_B, m_B, y_B, k_B)=(39\ 0\ 0\ 28)$ and $(c_C, m_C, y_C, k_C)=(45\ 10\ 10\ 20)$. By using Expression (1), all Color A, Color B and Color C are converted into the same RGB color $(r, g, b)=(112\ 184\ 184)$. The reason of causing this bias is because Expression (1) cannot support one-to-one mapping between CMYK and RGB.

Secondly, RGB has 3×256 color blocks and CMYK has 4×100 color blocks. That means, these color system contain a color base composed of 1168 key colors. It may be difficult to display clearly all these 1166 blocks on a graph, neither to manipulate these colors to obtain preferred colors. Since there are large numbers of and the color wheel is a two-dimensional graph, it is hard to allocate on such a color wheel.

In addition, these color system does not support easy color blending using available colors. For example, given a target color in RGB showing on a color rendering apparatus, current color systems do not support blend existing CMYK colors closing to the target color.

Without wishing to be bound by theory, the inventors devise that these deficiencies may be owing to the lack of a universal frame to bridge different color systems such as RGB, CMYK, and HSV.

Thus, it may be preferable to provide a universal frame having a common color space. Each color in RGB, CMYK, and HSV may be mapped into a unique color in this common space via a unique function. More preferably, under such a universal frame, the colors of various systems can be encoded, exchanged, mixed uniquely and precisely.

In accordance with an embodiment of the present invention, there is provided a color coding system comprising a color mapper arranged to map a plurality of colors with a plurality of numerical codes, wherein the each of the plurality of numerical codes is a unique integer determined based on a combination of prime numbers; wherein each of the plurality of numerical codes is arranged to represent a unique color in a color space wherein each of the prime numbers represents a respective basic color of the color space; and wherein the plurality of numerical codes are integers calculated based on addition and multiplication of a plurality of prime numbers.

In this example, the colors are represented in form of unique integers, such that the colors may be easily manipulated based on computational functions. For example, a result associated with mixing of multiple source colors to form a new color may be computed based on the numerical codes of the source colors, or a result associated decomposing a certain color to one or more basic colors in the color space may also be computed, by manipulating the numerical codes representing these colors using computational functions.

In the following examples, embodiments of the universal color coding system may alternatively be abbreviated as "U-Color" which integrates alternative color representations such as RGB and CMYK, where all colors in a color space may be converted, exchanged and manipulated flexibly.

Preferably, the universal color system may include a plurality of unique color code each being assigned to represent a unique color, and there could be a million of colors. The following principles may be used for assigning the color codes:

As there are three basic colors each of which cannot be generated from other two colors, therefore, it is necessary to choose three basic numbers to represent the three basic colors, where each number does not has any of the other two numbers as a factor. The three numbers should be as simple as possible.

In addition, each color should have a unique complementary color. For example, cyan is complementary with red, since the mixture of cyan and red results in black. Similarly, magenta is complementary with green, and yellow is complementary with blue. Therefore, each color code should be capable of specifying its complementary color code.

Furthermore, all colors should be composed of the three basic colors. Therefore, all color codes should be composed by the three basic color codes only. Each color has a unique color code, and each color code has a unique color.

In one example embodiment, the least three prime numbers 2, 3, and 5 may be used to represent three basic colors. Since CMYK, the color ink system, has one more explicit factor (i.e. k) than RGB, the color light system, 2, 3, and 5 may be chosen to represent cyan, magenta, and yellow, respectively. Based on prime-number-theory, $C_{235}$ creates an integer space where each color has a unique integer number.

Preferably, the plurality of numerical codes are integers calculated based on a multiplication of prime numbers, wherein each of the prime numbers represents a respective basic color of the color space. For example, in RGB color representation, the basic colors are red, green and blue whereas in CYMK, the basic colors are cyan, yellow and magenta.

In addition, their products, i.e. 6, 15, 10, and 30 may represent blue, red, green, and gray, which represent a mixture of colours, e.g. 2×3×5=30 represents grey, where × (the multiplication operator) is used to denote the mixture of colors; it means, grey (coded as 30) is the mixture of an equal proportion of cyan (2), magenta (3), and yellow (5).

In alternative example, 3×5=15 represents red, since red is composed of magenta (3) and yellow (5). Cyan (2) and red are also complementary pair, satisfying 2×15=30, which means the equal portion mixture of cyan and red becomes grey.

Similarly, 2×5=10 may be used in $C_{235}$ to represent green, and use 2×3=6 may be used to represent blue. Denote <*> as the color code of *. Therefore the $C_{235}$ coding system may use <2>, <3>, <5>, <6>, <10>, <15>, and <30> as the color codes of cyan, magenta, yellow, blue, green, red, and grey respectively, as illustrated on the $C_{235}$ palette in FIG. 1.

Moreover, $C_{235}$ can use $2^2 \times 3=12$, $2 \times 3^2=18$, $3^2 \times 5=45$, $3 \times 5^2=75$, $2 \times 5^2=50$ and $2^2 \times 5=20$ to represent respectively cyan-blue, blue-magenta, magenta-red, red-yellow, yellow-green and green-cyan.

$C_{235}$ is capable to treat color overflow problems which are hard to be handled in current CMYK and RGB systems. For instance, if there are three colors i, j and k expressed in CMYK as color(i)=(90, 50, 0, 0), color(j)=(80, 30, 0, 0) and color(k)=(70, 10, 0, 0), these three colors can be expressed in $C_{235}$ as color(i)=$2^{90}3^{50}$, color(j)=$2^{80}3^{30}$ and color(k)=$2^{70}3^{10}$, the merger of color(i) and color(j) becomes $2^{90}3^{50} \times 2^{80}3^{30}=2^{90}(2 \times 3)^{80}=2^{90}6^{80}$, which is the mixture of cyan at level 90 and blue at level 80. The merger of color(i), color(j) and color(k) becomes $2^{90}3^{50} \times 2^{80}3^{30} \times 2^{70}3^{10}=2^{60}(2^2 \times 3)^{90}=2^{60}12^{90}$, which is the mixture of cyan at level 60 and cyan-blue at level 90. It is also clearly shown that cyan-red, blue-yellow, and green-magenta are three complementary pairs.

Alternatively, other prime numbers may be used instead. In this disclosure, the prime numbers are denoted as $p_i$ representing i basic colors or color components.

In addition, based on prime-number-theory, the intensity of each of the color components $p_i$ may be represented as indices j of the prime number $p_i$, i.e. $p_i^j$, therefore the integer is obtain by a multiplication of all color components $p_i^j$ with different intensities j.

For example, a color may be represented as an integer $2^\alpha 3^\beta 5^\sigma$ for $\alpha$, $\beta$, $\sigma$ be integers within 0 and 255. Based on this representation, more than 16 million colors may be mapped by the color mapper. The mixture of multiple colors can also be manipulated conveniently. Alternatively, different number of i and j may be used in different embodiments such that the color mapper may map a different number of colors in a color space. For example, when j is in the range of 0-63, the color mapper may map around 26 thousands colors based on 3 basic colors $p_i$.

For example, the integer or the numerical code may be further manipulated mathematically using different color functions. The color functions for RGB, CMYK, and HSV may be expressed respectively as q (r, g, b), f (c, m, y, k) and t (h, s, v), and the colors may be converted based on the relationship of $2^\alpha 3^\beta 5^\sigma$=f (c, m, y, k)=t (h, s, v)=q (r, g, b).

The color coding system may be used to convert colors in any one of the RGB space, CMYK space, and HSV space. In order to bridge colors in these three spaces, the universal color space (or the $C_{235}$ color system) may be referenced, which composed of all colors in RGB, CMYK, and HSV. Preferably, each color has a unique integer number, and is record in a color mapper, such that the desired color may be identified by locating the record associated with the color code represented by the unique integer.

In addition, the color coding system may further comprises a color manipulation module, a color conversion module, a color fitting module, a color mixer and/or a color processing module to process the color or the color codes as further described below.

For reference only, the color codes and the mapping functions associated with the colors may be represented as follows.

Consider a color i, which has CMYK values ($c_i$, $m_i$, $y_i$, $k_i$) and RGB values ($r_i$, $g_i$, $b_i$). By utilizing prime numbers, we want to assign a unique code to color i, and use a unique number to represent color i. Thus to unify current color systems such as CMYK and RGB. The conversion and mixture between CMYK and RGB will then become more convenient. Denote Color(i) as the color code of i. Color(i) can be specified either in (2, 3, 5) base or (6, 10, 15) base.

If in the (2, 3, 5) base, Color(i) is specified as Expression (2):

$$\text{Color}(i)=<2^{2.56ci}3^{2.56mi}5^{2.56yi}>=<2^{ci}3^{mi}5^{yi}>^{2.56}.$$

Color(i) can also be written as below based on RGB as Expression (3):

$$\text{Color}(i)=2^{256-ri}3^{256-gi}5^{256-bi}.$$

If in (6, 10, 15) base then Color(i) is specified as Expression (4):

$$\text{Color}(i)=<15^{mi+yi}10^{ci+yi}6^{ci+mi}>^{1.28}.$$

In above expressions, $c_i$, $m_i$, $y_i$, $k_i \in \{0, 1, 2, \ldots, 99\}$ and wherein $k_i=\min\{c_i, m_i, y_i\}$, $r_i$, $g_i$, $b_i \in \{0, 1, 2, 3, \ldots, 255\}$, where Expression (5):

$$2.56c_i+r_i=256, 2.56m_i+g_i=256, 2.56y_i+b_i=256$$

Value 2.56=256/100 is a range ratio between CMYK and RGB values. Expression (3) is identity of Expression (2), where $k_i$ is the minimal of $c_i$, $m_i$, and $y_i$. Expression (4) is also the identity of Expression (2).

For a color i with CMYK values ($c_i$, $m_i$, $y_i$, $k_i$) and RGB values ($r_i$, $g_i$, $b_i$), denote Number(i) as the number of color i specified as $$\text{Number}(i)=256^2 r_i+256 g_i+b_i, \quad \text{Expression (6):}$$

where $r_i$, $g_i$, $b_i \in \{0, 1, 2, 3, \ldots, 255\}$.

Based on the above, the range of Number (i) is $\{0, 1, \ldots, 256^3\}$. That means, by utilizing Expression (6), each of $256^3$ colors may be assigned with a unique number, and give each of the numbers between 0 and $256^3$ a unique color.

By reference to Expression (5), Number(i) can also be re-written as $$\text{Number}(i)=16843008-167772.$$
$$16c_i-655.36m_i-2.56y_i. \quad \text{Expression (7):}$$

Expression (2) may represent a universal color code and Expression (6) may represent a universal color number. Both can be utilized to unify colors effectively.

Example 1

For example, consider two colors i and j, the CMYK values for these two colors are ($c_i$, $m_i$, $y_i$, $k_i$)=(56, 28, 28, 0) and ($c_j$, $m_j$, $y_j$, $k_j$)=(39, 0, 0, 28). Then, the corresponding RGB values for color i and color j may be obtained as follows:

If by the current converse formula in Expression (1), the RGB value for both colors is (112, 184, 184), which is not right. By the universal code system in Expression (2) and Expression (3):
Color(i)=$<2^{2.56 \times 56} 3^{2.56 \times 28} 5^{2.56 \times 28}>=<2^{256-ri} 3^{256-gi} 5^{256-bi}>$,
therefore ($r_i$, $g_i$, $b_i$)=(112, 184, 184).
For color j, (39, 0, 0, 28) may be first converted to a universal code as:
Color (j)=$<2^{2.56(39+28)}, 3^{2.56(28)}, 5^{2.56(28)}>=<2^{256-rj}, 3^{256-gj}, 5^{256-bj}>$.
Then, ($r_j$, $g_j$, $b_j$)=(84, 184, 184) may be obtained. It is a right conversion.
Number(i) and Number(j) may be computed by Expression (6) or Expression (7) as:

$$\text{Number}(i)=256^2 \times 112+256 \times 184+184=7{,}387{,}320,$$

$$\text{Number}(j)=256^2 \times 84+256 \times 184+184=5{,}552{,}312.$$

Expressions (2) to (6) are all based on 8 bits color frame, where $c_i$, $m_i$, $y_i$, $k_i \in \{0, 1, 2, \ldots, 100\}$ and $r_i$, $g_i$, $b_i \in \{0, 1, 2, 3, \ldots, 256\}$. It can also be expanded to a high color system with 9 bits color frame, where $c_i$, $m_i$, $y_i$, $k_i \in \{0, 1, 2, \ldots, 200\}$ and $r_i$, $g_i$, $b_i \in \{0, 1, 2, 3, \ldots, 512\}$. To simplify expressions, the following examples only considers the 8 bits frame.

As described in earlier, example color systems of RGB and CMYK require a key color base composed of 1168 key colors. Here we form a $C_{235}$ key color base contains much less numbers of key colors.

A critical point in designing a compact key color base is how to use less values to express. Number(i) in Expressions (6) or (7). Preferably, Goldbach conjecture may be applied.

Goldbach conjecture claims that, an even integer larger than three can be expressed as the sum of two prime numbers. In order to express $r_i$, $g_i$ and $b_i$ values in a compact way. Denote c as the k-th prime number. Let $\rho^*$ be the set of first 18 prime numbers, specified as:
$\rho^* = \{\rho_1, \rho_2, \ldots, \rho_{18}\} = \{2, 3, 5, 7, 11, 13, 17, 19, 23, 29, 31, 37, 41, 43, 47, 53, 59, 61\}$.
Let $\rho^{}$ be the set of first 33 prime numbers, specified as $\rho^{} = \{2, 3, 5, 7, 11, 13, 17, 19, 23, 29, 31, 37, 41, 43, 47, 53, 59, 61, 67, 71, 73, 79, 83, 89, 97, 101, 103, 109, 113, 127, 131, 137, 139\}$.

Following Goldbach conjecture, $r_i$, $g_i$, $b_i$ may be expressed as $r_i = \theta_{i1} + d_{i1} + d_{i2}$, $g_i = \theta_{i2} + d_{i3} + d_{i4}$, $b_i = \theta_{i3} + d_{i5} + d_{i6}$. Then, Number(i) is re-written as $$\text{Number}(i) = 256^2(\theta_{i1} + d_{i1} + d_{i2}) + 256(\theta_{i2} + d_{i3} + d_{i4}) + (\theta_{i3} + d_{i5} + d_{i6}), \qquad \text{Expression (8):}$$

where $d_{i1}$, $d_{i2}$, $d_{i3}$, $d_{i4}$, $d_{i5}$, $d_{i6} \in \{\rho_1, \rho_2, \ldots, \rho_{33}\}$, and
$r_i = \theta_{i1} + d_{i1} + d_{i2} \leq 255$,
$g_i = \theta_{i2} + d_{i3} + d_{i4} \leq 255$,
$b_i = \theta_{i3} + d_{i5} + d_{i6} \leq 255$,
in which $\theta_{i1}$, $\theta_{i2}$, $\theta_{i3}$ are binary variable to specify whether $r_i$, $g_i$ and $b_i$ are even or odd.
For instance, if $r_i$ is even then $\theta_{i1} = 0$, and otherwise $\theta_{i1} = 1$. Expression (8) implies that each color number (i.e., Number (i)) can be expressed by 33×3=99 prime numbers. Color(i) can be re-written as:

$$\text{Color}(i) = <2^{256-(\theta_{i1} + d_{i1} + d_{i2})}, 3^{256-(\theta_{i2} + d_{i3} + d_{i4})}, 5^{256-(\theta_{i3} + d_{i5} + d_{i6})}>.$$

Each prime number $d_{i,l}$ for $l = 1, 2, \ldots, 6$ is regarded as a key color, and is assigned a prime color. Similarly, Expression (7) can be rewritten as $$\text{Number}(i) = 16843008 - 167772.16(\theta'_{i1} + d'_{i1} + d'_{i2}) - 655.36(\theta'_{i2} + d'_{i3} + d'_{i4}) - 2.56(\theta'_{i3} + d'_{i5} + d'_{i6}), \qquad \text{Expression (9):}$$

where $d'_{i1}$, $d'_{i2}$, $d'_{i3}$, $d'_{i4}$, $d'_{i5}$, $d'_{i6} \in \{\rho_1, \rho_2, \ldots, \rho_8\}$ and $c_i = \theta'_{i1} + d'_{i1} + d'_{i2} \leq 100$, $m_i = \theta'_{i2} + d'_{i3} + d'_{i4} \leq 100$, $y_i = \theta'_{i3} + d'_{i5} + d'_{i6} \leq 100$, in which $\theta'_{i1}$, $\theta'_{i2}$, $\theta'_{i3}$ are binary variables for specifying whether $c_i$, $m_i$, $y_i$ are even or odd.

Figure 2A:
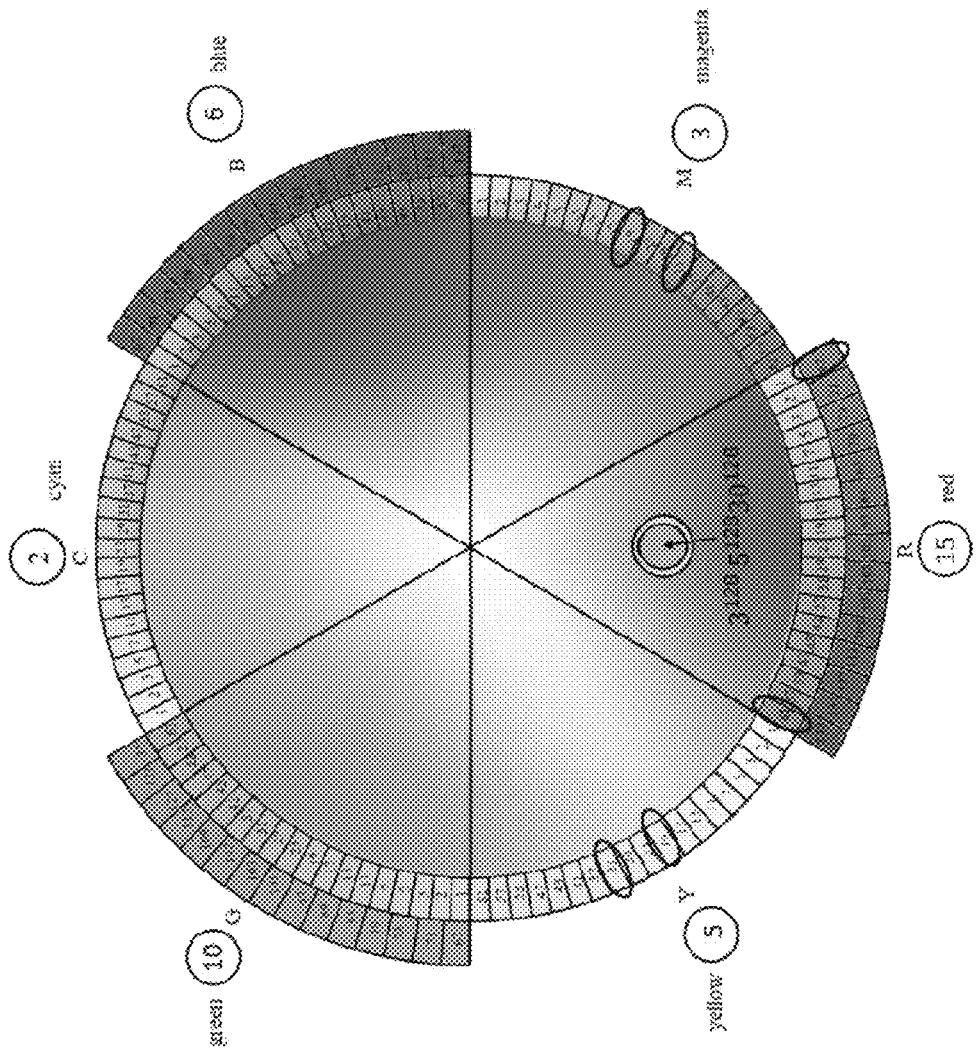

On the basis of Expression (8) and Expression (9), $C_{235}$ palette may be formed as shown in FIG. 2(a) that contains 6 color clusters, where 2, 3, 5, 6, 10, and 15 represents cyan, magenta, yellow, blue, green and red respectively.

FIG. 2 is composed of 174 key color blocks, where there are 4×(18+1)=72 CMYK key color blocks, 3×(33+1)=168 RGB key color blocks. Take cyan cluster for instance, there are 18 key color blocks of prime color $<2^1>$, $<2^2>$, $<2^3>$, $<2^5>$, $<2^7>$, $<2^{11}>$, $\ldots$, $<2^{67}>$. The merger of at most two of these color blocks plus $<20>$ will generate 100 levels of cyan. Take red cluster for instance, there are 56 blocks of prime color $<0>$, $<15^0>$, $<15^1>$, $<15^2>$, $<15^3>$, $\ldots$, $<15^{139}>$. The merger of at most two of these 33 color blocks plus $<15^0>$ will generate 256 levels of red.

Therefore, the merger of C, M, Y color blocks, where each cluster chosen at most two blocks will generate $100^3$ colors. Similarly the merger of R, G, B color blocks, will generate $256^3$ colors. The same color generate by CMY and RGB has the same color code and color number.

Preferably, $C_{235}$ palette may be useful for color manipulation, such as but not limited to adjusting a color, converting a color, blending colors, and subtracting colors, as described below.

(i) Adjusting a color. Given an initial color $<3^{128}5^{128}30^{128}>$ as illustrated in FIG. 2(a), its corresponding CMYK and RGB colors are:
CMYK(0, 50, 50, 50) or CMYK(50, 99, 99, 0) mboxandRGB(128, 0, 0).

From the aspect of RGB, Number(i) is calculated as $$\text{Number}(i) = 256^2 r_i + 256 g_i + b_i = 256^2 \times 128 = 256^2(61 + 67) = 8{,}388{,}608.$$

From the aspect of CMYK, Number(i) is calculated as Number(i)=16,843,008−167772.16(50)−655.36(99)−2.56(99)≅8,388,608, where 50=31+19, and 99=1+51+47.

For color $<3^{50}>$, since the most closing two primes summing to 50 are 31 and 19, therefore $<3^{50}>$ is regarded as the merger of $<2^{31}>$ with $<2^{19}>$. Similarly, color $<6^{256}>$ is the merger of $<6^{119}>$ and $<6^{137}>$, color $<15^{128}>$ is the merger of or $<15^{67}>$ and $<15^{61}>$. Using FIGS. 2(a) and 2(b), a user can adjust the target color $<3^{128}5^{128}30^{128}>$ via 6 directions, i.e., C, M, Y, R, G, B. Moving along the direction to C means to let the color be more cyan, while moving along the direction to M means to let the color more magenta.

Now suppose a user wants to adjust $<3^{128}5^{128}30^{128}>$ to let it be less reddish, the user may change $<15^{128}>$ to $<15^{64}>$. Then the initial color is adjusted as where (C, M, Y, K)=(0, 24, 24, 75) and (r, g, b)=(64, 0, 0).

(ii) Allocating a color. Any color can be allocated on a unique location on a $C_{235}$ Palette. Take color $<3^{128}5^{128}30^{128}>$ in FIG. 2(a) for instance, it is expressed as a small circle with a grey outer belt, and is allocated as a unique site on the color wheel. The detail of computing the location is described later in this disclosure.

(iii) Converting a color. Using a $C_{235}$ palette, RGB, CMYK, HSV, and $C_{235}$ system can convert with each other conveniently. For instance, it illustrate that based on a unified color code $<2^{128}3^{255}>$, RGB (128, 0, 255), CMYK (50, 99, 0), and HSV (270°, 100, 100) are converted with each other.

(iv) Printing out a color. If a scientist wants to print out a RGB (128, 0, 255) color via a CMYK printer, or an artist wants to print out an HSV (270°, 100, 100) via a CMYK printer, then the printer needs to own totally 4×100=400 color levels or key colors. However, by $C_{235}$ palette, it only needs to have totally 4×27=108 color levels.

The user can also choose cheaper pigments to print out the preferred color. For instance, if $(c_i, m_i, y_i, k_i) = (50, 99, 0, 0)$, to print out $<2^{50}>$, the user can choose $<2^{47}>$ and $<2^3>$ instead of $<2^{31}>$ and $<2^{19}>$, if the pigment cost of the former is cheaper than that of the pattern.

(v) Blending color. For current RGB or CMYK color systems, it is uneasy to predict the outcome color of blending multiple colors. Moreover, it is hard for current blend systems to blend some RGB colors with other CMYK colors, e.g. to determine the resulting color of "mixing" a red light on a blue cardboard.

Recall that a color consisting of multiple basic colors is obtained by multiplying all the prime numbers $p_i^j$, similarly, mixture of multiple colors may be obtained by multiplying all the prime numbers $p_i^j$ in all the individual colors.

In this example, the mixture color is a multiplication of the all the integers representing each of the two or more colors. For example the mixture color based on n colors is represented as $M(1, 2, 3, \ldots, n)$, wherein $M(1, 2, 3, \ldots, n) = p_1^{\Sigma_1{}^n \alpha_k} p_2^{\Sigma_1{}^n \beta_k} p_3^{\Sigma_1{}^n \sigma_k}$.

Preferably, $C_{235}$ palette is good at blending these kinds of colors. For instance, to blend CMYK (50, 20, 0, 0), CMYK (10, 0, 0, 20) and RGB (220, 150, 150), the $C_{235}$ palette will first contain these three colors into $C_{235}$ codes as $<2^{128}3^{51}>$, $<2^{773}3^{51}5^{51}>$, $<2^{363}10^{6}5^{106}>$. Then, to blend these three colors as $<2^{241}3^{208}5^{157}>$. Since $<2^{128}3^{51}>=<2^{11+39}3^{7+13}>^{2.56}$, $<2^{773}3^{51}5^{51}>=<2^{11+19}3^{7+13}5^{7+13}>^{2.56}$, and $<2^{363}10^{6}5^{106}>=<2^{3+11}3^{1+11+129}5^{1+11+29}>^{2.56}$.

Therefore the outcome color $<2^{241}3^{208}5^{157}>$ can be regarded as the merger of 12 prime colors. Another compact expression is that:

$$\langle 2^{241}3^{208}5^{157}\rangle = \langle 2^{241-127}6^{208-127}5^0 30^{127}\rangle$$
$$= \langle 2^{115}38^{1}30^{127}\rangle$$
$$= \langle 2^{44}3^{32}30^{50}\rangle^{2.56}$$
$$= \langle 2^{13+31}3^{13+19}30^{19+31}\rangle^{2.56},$$

which is the merger of $<2^{13}>$, $<2^{-}>$, $3^{13}>$, $<3^{19}>$, $<30^{19}>$, and $<30^{31}>$, as shown in FIG. 2(b).

(vi) Finding complementary colors. $C_{235}$ is good at finding complementary color pairs. Two colors $<2^{\alpha i}3^{\beta i}5^{\sigma i}>$ and $<2^{\alpha j}3^{\beta j}5^{\sigma j}>$ are double complementary if $\alpha_i+\alpha_j=\beta_i+\beta_j=\sigma_i+\sigma_j$. For instance, the complementary color of $<2^{128}3^{256}5^{0}>$ is $<2^{128}3^{0}5^{256}>$. Three colors $<2^{\alpha i}3^{\beta i}5^{\sigma i}>$, $<2^{\alpha j}3^{\beta j}5^{\sigma j}>$ and $<2^{\alpha t}3^{\beta t}5^{\sigma t}>$ are triple complementary if $\alpha_i+\alpha_j+\alpha_t=\beta_i+\beta_j+\beta_t=\sigma_i+\sigma_j+\sigma_t$. For instance, $<2^{50}3^{100}5^{0}>$, $<2^{50}3^{0}5^{100}>$ and $<2^{50}3^{0}5^{50}>$ are triple complementary.

In general, the color manipulation module may determine one or more relationships among multiple colors in the color space.

For example, it may determine a complementary relationship among multiple colors, based on the above, m colors are complementary colors if $\alpha_1+\alpha_2+\ldots+\alpha_m=\beta_1+\beta_2+\ldots+\beta_m=\sigma_1+\sigma_2+\ldots+\sigma_m$ for all the m colors $p_1^{\alpha 1}p_2^{\beta 1}p_3^{\sigma 1}$, $p_1^{\alpha 2}p_2^{\beta 2}p_3^{\sigma 2}$, $\ldots$, $p_1^{\alpha m}p_2^{\beta m}p_3^{\sigma m}$.

In an alternative example, it may determine monochromatic relationship between the target color and the baseline color. Two colors $p_1^{\alpha 1}p_2^{\beta 1}p_3^{\sigma 1}$ and $p_1^{\alpha 2}p_2^{\beta 2}p_3^{\sigma 2}$ are monochromatic if the two colors have the same hue ratio, i.e.

$$\frac{\alpha 1}{\beta 1} = \frac{\alpha 2}{\beta 2} \text{ for } \sigma_1 = \sigma_2 = 0; \text{ or}$$

$$\frac{\alpha 1}{\sigma 1} = \frac{\alpha 2}{\sigma 2} \text{ for } \beta_1 = \beta_2 = 0; \text{ or}$$

$$\frac{\beta 1}{\sigma 1} = \frac{\beta 2}{\sigma 2} \text{ for } \alpha_1 = \alpha_2 = 0.$$

For example, $2^{255}\ 3^{255}\ 5^0$ and $2^{128}\ 3^{128}\ 5^0$ are monochromatic.

In a preferred embodiment of the present invention, the $C_{235}$ color system may be useful in representing real objects with multiple attribute, by "colorizing" the object and allocating the objects at corresponding positions on the color ring according to their colors. It allows data analyzer to visualize the relationships among the objects based on the colors.

Preferably, a $C_{235}$ ring composed of $\lambda$ rounds is denoted as $CR(\lambda)$, which is modified based on the $C_{235}$ palette.

Denote $R(q)$ a q-th round, which is composed of $6\lambda$ hue blocks, these hue blocks form $\lambda$ round equidistantly around a circle with radius $\lambda$. $R(q)$ is specified as Expression 10:

$$R(q)=\{l_1, l_2, \ldots, l_{6q}\}, \text{ in which } l_j=<2^{\alpha j}3^{\beta j}5^{\sigma j}30^{kj}>,$$

where $\alpha_j$, $\beta_j$, $\sigma_j$ and $k_j$ are respectively the hue values of cyan, magenta, yellow, and gray.

As described, $<2>$, $<3>$, and $<5>$ may be used to mark colors Cyan, Magenta, and Yellow. Since grey is a mixture of cyan, magenta, and yellow with an equal proportion, use $<30>=<2\times3\times5>$ to mark grey, where variable k is the level value of grey. Variable k takes the minimum value of $\alpha$, $\beta$, $\sigma$.

Denote $T(h)$ the set of grey blocks, specified as $$T(\lambda)=\{30, 30^2, \ldots, 30^h\}.$$

Then $CR(\lambda)$ represents a color palette composed of $R(1)$, $R(2), \ldots, R(\lambda)$ and $T(h)$, specified as $$CR(\lambda)=R(1)\cup R(1)\cup \ldots \cup R(\lambda)\cup T(h). \quad \text{Expression (11):}$$

Figure 3B:
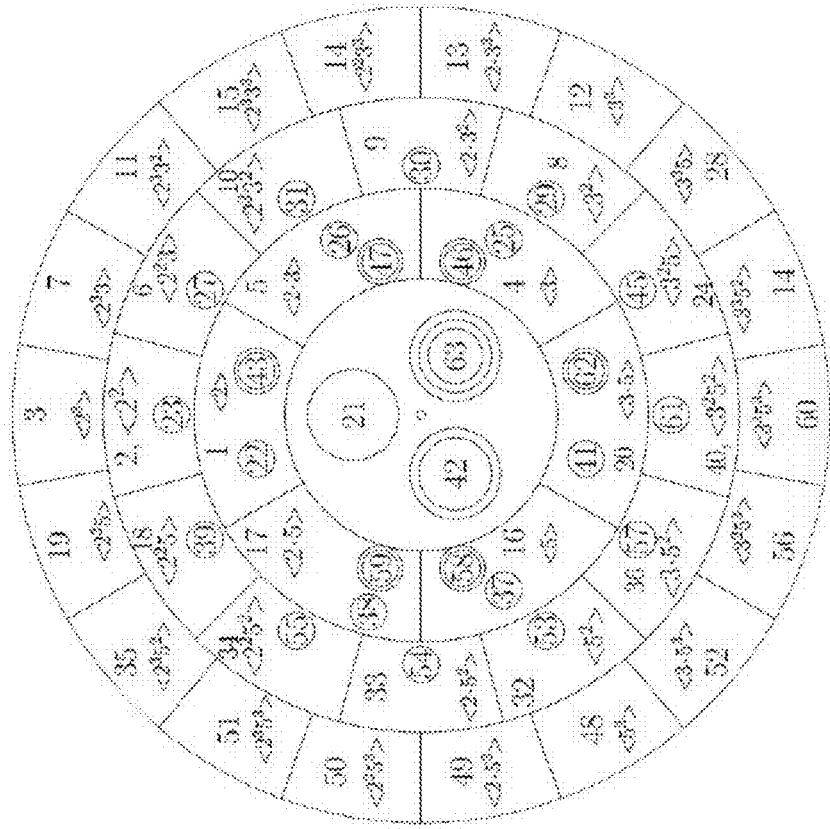
FIGS. 3a and 3b are two color rings of CR(3) for λ=3.
Figure 3A:
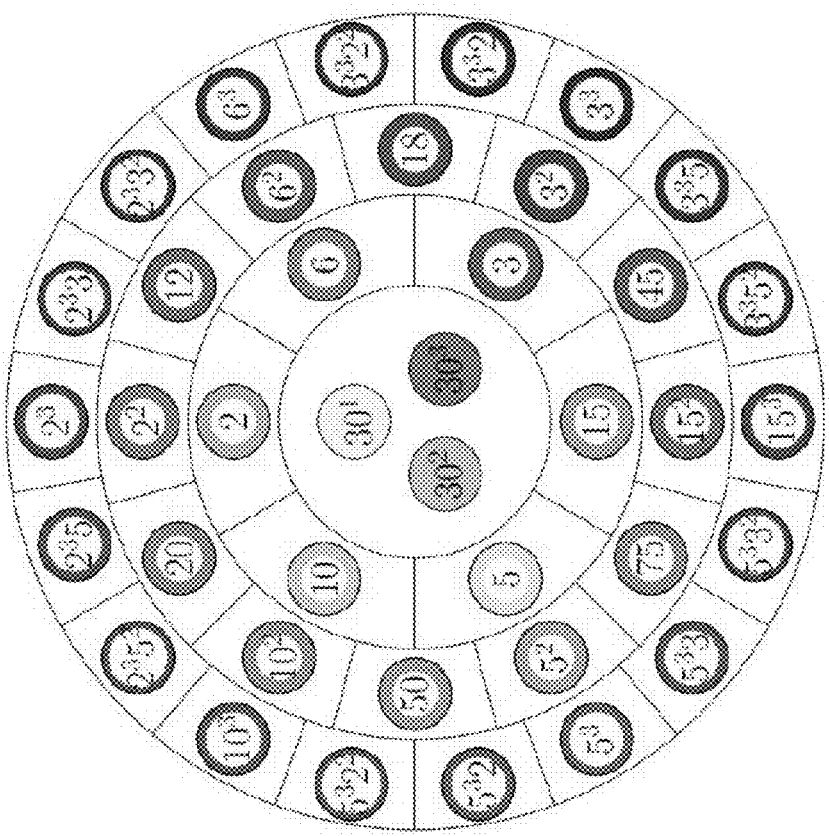

FIG. 3(a) is an illustration of a 3-round color ring, denoted as $CR(3)$, where the first round has 6 hue blocks, expressed clockwise as $R(1)=\{<2>,<6>,<3>,<15>,<5>,<10>\}$ and $|R(1)|=6$. Similarly, the second round has 12 hue blocks, expressed clockwise as $R(2)=\{<2^2>,<2^23>,<6^2>,<23^2>,<3^2>, \ldots, <10^2>, <2^25>\}$ and $|R(2)|=12$.

The third ring is given by $R(3)=\{<2^3>,<2^33>, <2^33^2>, \ldots, <2^35>\}$ and $|R(3)|=18$.

The grey set, located at the inner circle of $CR(3)$, is given as: $T(3)=\{<30>,<30^2>,<30^3>\}$.

The $CR(3)$ is the union of $R(1)$, $R(2)$, $R(3)$ and $T(3)$, or $CR(3)=R(1) \cup R(2) \cup R(3)$.

The total number of blocks of $CR(3)$ thus is $6+12+18+3=39$. Worthy to note that the intervals between color blocks on the same ring have an equal length.

It implies that the principle of allocating color on a circle is. To keep the distances between each two of three blocks $<2^\alpha>$, $<5^\alpha>$, and $<5^\alpha>$ the same on round q for $q=1, 2, \ldots, \lambda$.

To colorize number sets on a $C_{235}$ Ring, let $N(n)$ be an integer set composed of natural numbers $1, 2, \ldots, n^3-1$, where $n \leq 256$.

For any integer $t_i \in N(n)$, $t_i$ can be expressed as $$t_i=b_{i1}+b_{i2}n+b_{i3}n^2; \quad \text{Expression (12):}$$

where $b_{i1}$, $b_{i2}$, $b_{i3}$ are integers smaller than n.

Integer $t_i$ is colored as color $(t_i)$, specified as $$\text{Color}(t_i)=<2^{bi1}3^{bi2}5^{bi3}>=<2^{bi1-ki}3^{bi2-ki}5^{bi3-ki}30^{ki}>, \quad \text{Expression (13)}$$

where $k_i=\min\{b_{i1}, b_{i2}, b_{i3}\}$.

For integers $t_i$, $t_j \in N(n)$, if $b_{i1}+b_{j1} \leq n$, $b_{i2}+b_{j2} \leq n$, $b_{i3}+b_{j3} \leq n$, then the merger of colors $color(t_i)$ and $color(t_j)$ becomes $$color(t_i) \text{ merge } color(t_j)=color(t_i+t_j)=\\ <2^{bi1+bj1}3^{bi2+bj2}5^{bi3+bj3}>. \quad \text{Expression (14):}$$

Example 2

Consider the integer set $N(63)=\{t_i|t_i=1, 2, \ldots, 63\}$. Since $4^3=63+1$, $t_i$ is expressed as:

$$t_i = b_{i1} + 4b_{i2} + 16b_{i3}, \text{ for } b_{i1}, b_{i2}, b_{i3} \in \{0,1,2,3\}.$$

$$\text{Color}(t_i) = <2^{bi1-ki} 3^{bi2-ki} 5^{bi3-ki} 30^{ki}>.$$

It is possible to allocate all $t_i$'s into a circle of hue blocks CR(3), which is composed of T(3), R(1), R(2) and R(3), as shown in FIG. 3(b). Describe below.

(i) The inner circle T(3) contains four numbers {0, 21, 42, 63}. Take 42 for instance. $42=2(1+4+16)$ with color $(42)=<2^2 3^2 5^2> = <30^2>$, expressed as grey at level 2.

(ii) The first ring R(1) has six hue blocks <2>,<2·3>,<3>, <3·5>,<5>,<2·5>, each of which contains three numbers. Take the block <2> as an instance. It contains three numbers 1, 22 and 43, where $22=1+21$ with color$(22)=<2^2 3^1 5^1> = <2^1 30^1>$, expressed as cyan <2> with level 1 grey.

(iii) The second round R(2) has 12 hue blocks, each of which contains two numbers. The third ring R(3) has 18 hue blocks, each of which has only one number.

(iv) Referring to Expression (14), for round R(1), there are 9 pairs of double complementary integers, such as (1, 20), (5, 16), and (4, 17), having a sum of 21. There are some pairs of triad complementary integers, such as (1, 4, 16), (5, 17, 20), (22, 25, 37), (26, 38, 41), . . . . Each of the complementary integers has the merge color of grey. Take (1, 20) and (5, 17, 20) for instance, color$(1+20)=<2^1 3^1 5^1> = <30^1>$, and color$(5+17+20)=<2^1 3^1><2^1 5^1><3^1 5^1>=<30^2>$.

To color a large integer set $N(256)=\{3, 4, 5, \ldots, 256^3\}$ in RGB, denote $p_1=2$, $p_2=3$, $p_3=5$, $p_4=7$, . . . , $p_{53}=241$, $p_{54}=251$ the 54 prime numbers between 4 and 256. Following Goldbach conjecture, each even number between 4 and 256 can be expressed by the sum of a unique pair of prime numbers $p_i$ and $p_j$, which are the closest to each other. Referring to Expression (12), any integer $t_i \in N(256)$, may be expressed as $$t_1 = w_{i1} + d_{i1} + d_{i2} + (w_{i2} + d_{i3} + d_{i4})256 + (w_{i3} + d_{i5} + d_{i6})256^2,$$  Expression (15):

where $d_{i1}$, $d_{i2}$, $d_{i3}$, $d_{i4}$, $d_{i5}$, $d_{i6} \in \{p_1, p_2, \ldots, p_{54}\}$ and $d_{i1}+d_{i2} \leq 255$, $d_{i3}+d_{i4} \leq 255$, $d_{i5}+d_{i6} \leq 255$; and $d_{i1}$ and $d_{i2}$ (as well as $d_{i3}$ and $d_{i4}$, $d_{i5}$ and $d_{i6}$) are kept as close as possible.

These $d_{i1}$ are treated as "integer seeds" of expressing an integer $t_i$. In which $w_{i1}$, $w_{i2}$, $w_{i3}$ are binary variables used to specify if an integer is even or odd. Expression (15) implies that each integer $t_i$ in N(256) can be expressed by 6 of 54×3=162 prime numbers.

The colors of prime numbers $<p_1>, <p_2>, \ldots, <p_{54}>$ are the "color seeds" in coloring N(256). Referring to Expression (9), the color of ti is expressed as $$\text{color}(t_i) = <2^{wi1+di1+di2} 3^{wi2+di3+di4} 5^{wi3+di5+di6}>$$  Expression (16):

Similar way can also be used to color an integer set N(100) in CMYK system. Consider the following example.

Example 3

For an arbitrary integer 965,714, its associated colors and locations for RGB and CMYK systems may be determined as follows:

(i) In RGB system, n≤256, and then
$965714 = 82 + 188 \times 256 + 14 \times 256^2$.

Following Goldbach conjecture, we can express 82, 188, and 14 by prime numbers as follows:

$82 = p_{13} + p_{13} = 41 + 41$, $188 = p_{22} + p_{29} = 79 + 109$, $14 = p_4 + p_4 = 7 + 7$. Note that (41, 41), (79, 109), and (7, 7) are the closest pairs of prime numbers for summing up to 82, 188 and 14, respectively. So, $965714 = 41 + 41 + (79 + 109)256 + (7 + 7)256^2$.

Suppose there are 54 colors corresponding to the 54 prime numbers between 2 and 256, where $p_{13} = <2^{41}>$, $p_{22} \times 256 = <3^{79}>$, $p_4 \times 256^2 = <5^7>$.

Therefore, color$(965714) = <2^{82} 3^{188} 5^{14}> = <2^{68} 3^{174} 30^{14}>$.

Figure 4:
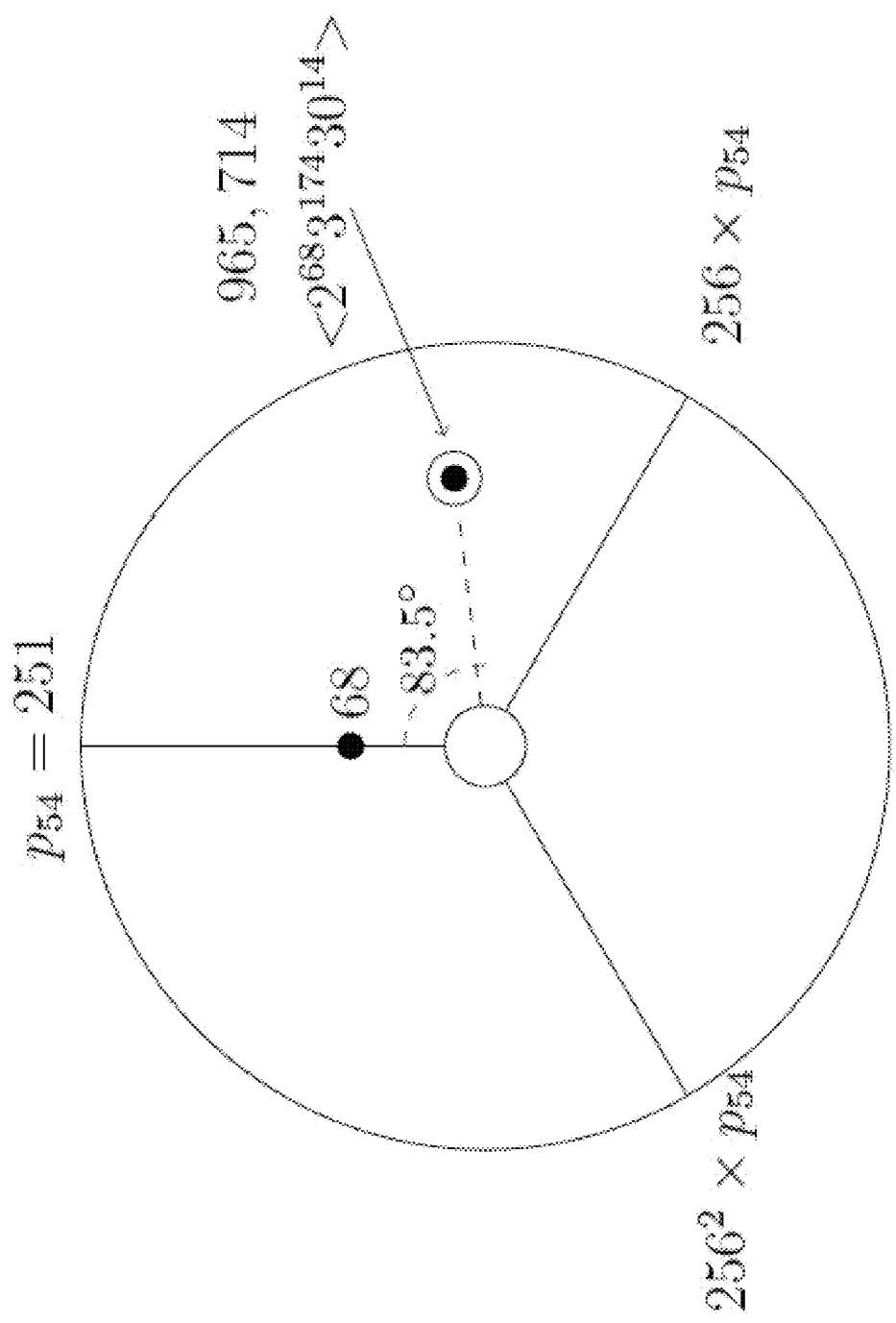
FIG. 4 is another color ring illustrating an example of color a large integer set.

The color is located at R(174) on a color palette CR(255) at angle $\theta = 60° + 60°$ (68/174)≈83.5°, as illustrated in FIG. 4.

(ii) In CMYK system, n≤100, and
$965714 = 14 + 57 \times 100 + 96 \times 100^2$.

Therefore, color$(965714) = <2^{14} 3^{57} 5^{96}> = <3^{43} 5^{82} 30^{14}>$.

The color is located at R(82) on a circle of hue blocks CR(99) with angle $\theta = 120° + 60°$ (43/82)≈151.5°.

Next, to colorize objects on $C_{235}$ Rings, denote $Q_m$ a set of m objects, where each object i has h attributes. The values associated with the j-th attribute are $\{1, 2, \ldots, \delta_j\}$. Set $Q_m$ is thus specified as $$Q_m = \{(a_{i1}, a_{i2}, \ldots, a_{ih}) | a_{ij} \in \{1, 2, \ldots, \delta\}, \text{ for } 1 \leq i \leq m, 1 \leq j \leq h\}.$$  Expression 17:

Denote $N_m$ a set of m integers, where each integer $l_i$ is a number assigned to object i in $Q_m$. Set $N_m$ is specified as $N_m = \{l_1, l_2, \ldots, l_m\}$, in which $$l_i = a_{i1} + a_{i2}(\delta+1) + \ldots + a_{ih}(\delta+1)^{h-1}.$$  Expression 18:

In these expressions, for each object i with a unique vector $(a_{i1}, a_{i2}, \ldots, a_{ih})$, there is a unique $l_i$. Expression (18) may be called a "number equation of objects."

It is obvious that $l_i \leq (\delta+1)^h - 1$. $(\delta+1)^{j-1}$ in Expression (18) the "criteria integer" on the j-th attribute, or the weight on attribute j. Expression (18) implies that the number assigned to object i is a weighted sum of its attribute values. For h=3, Expression (18) becomes $$l_i = a_{i1} + a_{i2}(\delta+1) + a_{i3}(\delta+1)^2.$$  Expression (19):

Referring to Expression (19), for a set of objects with three attributes (i.e. h=3), a color may be assigned to the object i as $$\text{Color}(l_i) = <2^{ai1-k} 3^{ai2-k} 5^{ai3-k} 30^k>,$$  Expression (20):

where $a_{i1}$, $a_{i2}$, $a_{i3}$ are the same as in Expression (18), $a_{i1}$, $a_{i2}$, $a_{i3} \in \{1, 2, \ldots, \delta\}$, and $k = \min\{a_{i1}, a_{i2}, a_{i3}\}$.

Expression (20) may be called a "color expression of number", where <2>,<3>,<5> and <30> are not the actual number values but the symbols of colors, which may be also called "seed colors" on the attribute. That means, the first, the second and the third attributes of the object is marked by seed colors "Cyan", "Magenta", and "Yellow", respectively.

Example 4

Figures 5A, 5B:
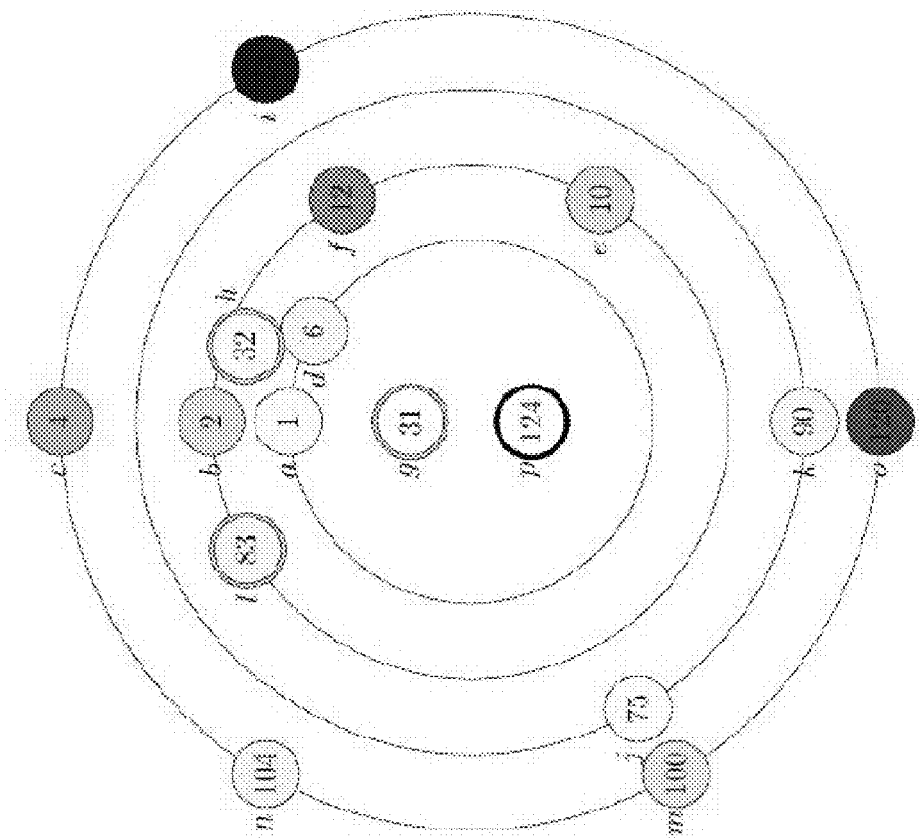
FIG. 5A is a table showing 16 people with different attributes being colorized.
FIG. 5B is a color ring showing the 16 people with different attributes of the table of FIG. 5A being colorized and allocated on the color ring.

Consider a set of 16 people, identified as a, b, c, . . . , p. Each person has a unique feature specified by three attributes, i.e., education, income, and age. Each of the three attributes has four levels {1, 2, 3, 4} indicating the status "low", "fair", "middle", and "high", respectively. In this example, we set m=16, λ=4, and h=3. By assigning colors "cyan", "magenta", and "yellow" to education, income, and age, respectively. (See FIG. 5A and and FIG. 5B)

(i) Person a is represented by number 1, since $l_a = a_1 + b_1 \times 5 + c_1 \times 5^2 = 1$, where $a_1 = 1$ (low education) and $b_1 = c_1 = 0$. Number 1 has color code <21>, which is a cyan hue at level 1 (very light cyan). Similarly, individual b ($a_2 = 2$, $b_2 = c_2 = 0$) and individual c ($a_4 = 4$, $b_4 = c_4 = 0$) have color codes <22> (light cyan) and <24> (cyan).

(ii) Individual d, who exhibits the feature of low education and low income, has number 6 ($a_{11}=1$, $b_{11}=1$, $c_{21}=0$) with color code $<2^1 3^1>=<6^1>$, which is a blue, the mixture of (very light cyan) and (very light magenta).

(iii) Individual g is inferior in education, income, and age has the color code $<2^1 3^1 5^1>=<30^1>$ (very light grey). The individual h is numberized as 32 with color code $<2^2 3^1 5^1>=<2\times 30>$, the mixture of (very light cyan) with (very light grey), which is depicted as an inner small circle with (very light cyan) and an outer ring with (very light grey).

(iv) Individual l, numberized as 83, is colorized with $<2^2 5^2 30>$, an inner circle of very light grey with a light green.

(v) Individual p has high values in education, income, and age and is colorized as 124. Since $124=4(1+5+25)$, p is colored as $<2^4 3^4 5^4>=<30^4>$.

A color ring CR(4) is illustrated in FIG. 3(b).

Preferably, the $C_{235}$ color system may also be used for colorization of other objects. With the rise of computational biology and genomics, the DNA codon table of indicating the relationship between 22 amino acids and 64 genetic codon becomes very useful. After colorizing genetic codons using $C_{235}$, the current DNA codon table can be converted into a colorful acidcodon circle. In addition to the codon table, via colorizing protein-binding sites by $C_{235}$, it is possible to display all common sites of some consensus sequences on a colorful circle, consequently revealing the relationship behind the sites.

Figure 6:
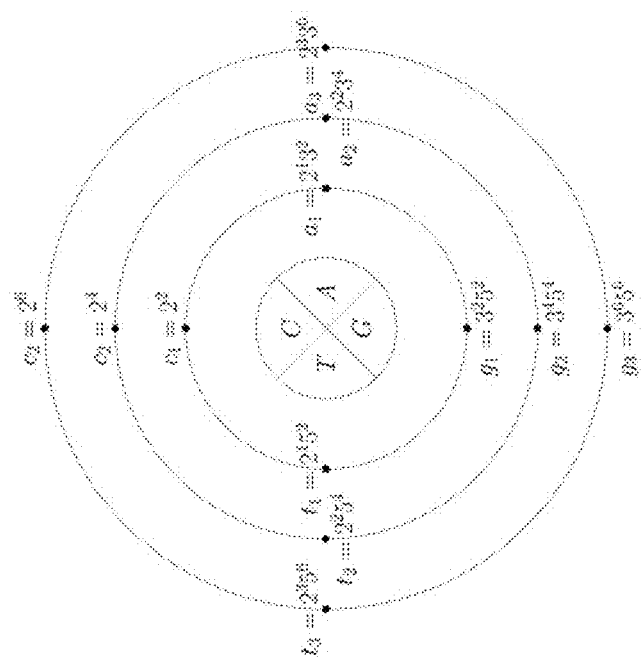
FIG. 6 is an example genetic codon table represented by color codes.

With reference to FIG. 6, there is shown an example genetic codon table represented by color codes, where T and A, as well as C and G, are complementary with each other.

Example 5

For example, an acid may be composed of GCT, GCC, GCG, GCA, and is denoted as acid 1={GCT, GCC, GCG, GCA}.

A three-letter genetic code may be specified as:

$(L_1, L_2, L_3)$, where $L_i \in \{T, C, G, A\}$ for i=1, 2, 3.

Using $C_{235}$, each letter of T, C, G, A may be assigned with a color code. Denote $t_l$, $c_l$, $g_l$ and $a_l$ respectively the color codex of T, C, G, A at the position l. With reference to the hue circle, these color codes are assigned as shown on FIG. 6.

In this example the "color" of acid 1 is allocated as Color(acid1)=$(g_1 c_2)^4 [t_3 \times c_3 \times g_3 \times a_3] = <(2^2 30^2)^4 30^{12}> = <2^8 30^{20}>$. The color of acid 1 can be illustrated as a small circle; where the inner circle has the color of 28 (i.e., cyan color at hue level of 8) and outer circle has the color of $<30^{20}>$ (i.e., grey color at black-white level of 20).

Figure 7:
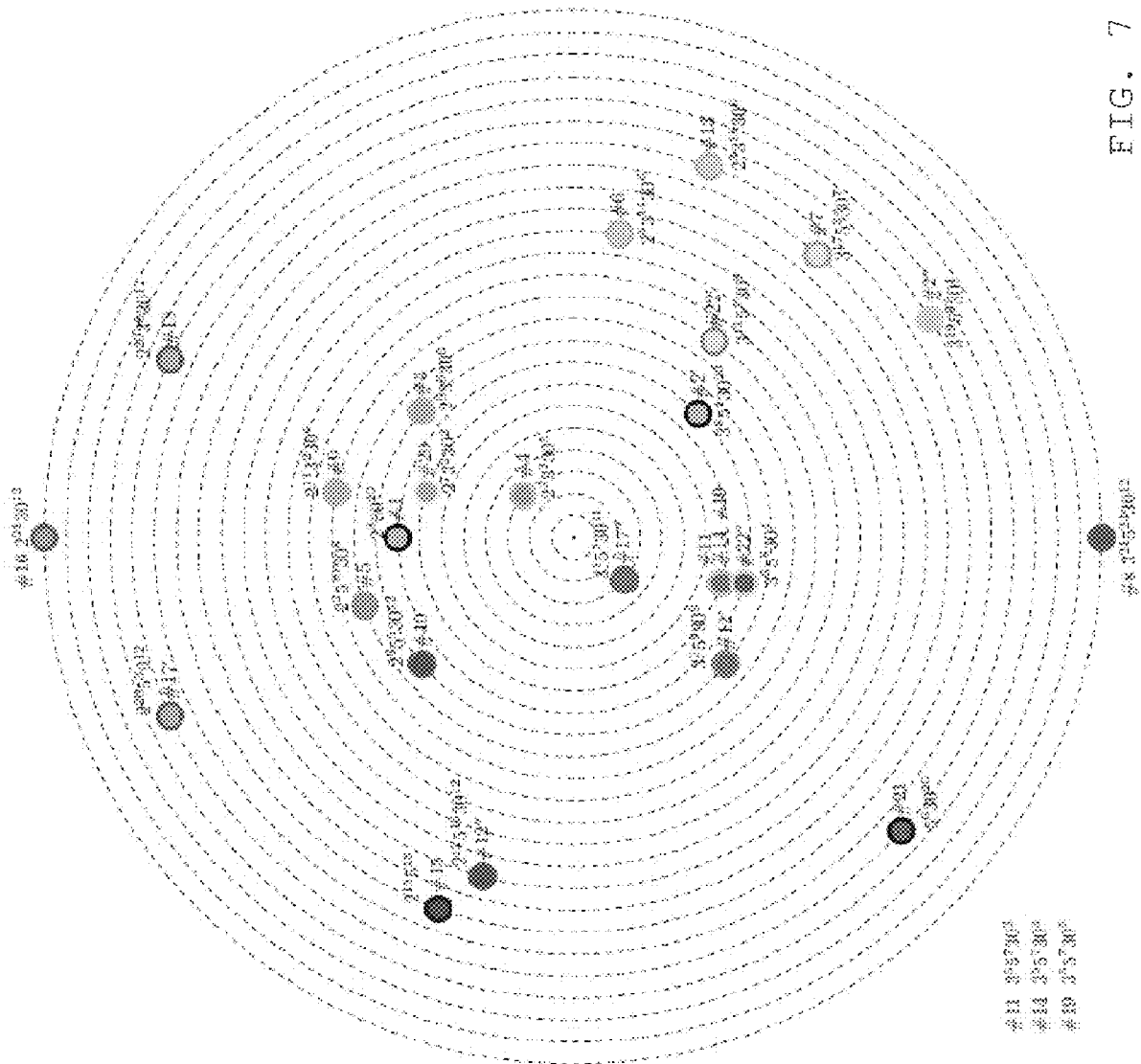
FIG. 7 is a 24 ring $C_{235}$ circle for DNA coda showing 22 DNA being allocated on the color ring.

Referring to FIG. 7, there is shown a 24 ring $C_{235}$ circle for DNA coda. In this example, a number of acids colorized by the $C_{235}$ color system are determined to have the following relationships:

(i) Acids #1, #2 and #21 form a triad complementary.

(ii) There are four complementary pairs.

(iii) Acids #6 and #9 form a 'mirror of diagonal" relationship.

(iv) Acids #17' and #18 form a "mirror on neutral" relationship.

(v) Acids #11 and #22" form approximately a monotonic.

| Color relationships among acids | Resulting colors |
|---|---|
| Triad complementary #1 & #2 & #21 | $<2^8 30^{20} \times 3^{85} 230^{20} \times 5^6 30^{20}> = <30^{68}>$ |
| Complementary Pair #4 & #17" #8 & #16 #13 & #15 #19 & #20 | $<2^{33} 2^3 30^5 \times 3^{15} 5^3 30^{11}> = <30^{19}>$ $<3^{24} 5^{24} 30^{12} \times 2^{24} 30^{12}> = <30^{36}>$ $<2^{33} 1^8 30^6 \times 2^{15} 5^{18}> = <30^{24}>$ $<3^5 5^7 30^5 \times 2^7 3^2 30^2> = <30^{14}>$ |
| Mirror on diagonal #6 & #9 | $<2^5 3^{14} 30^6> \leftrightarrow <2^{11} 3^2 30^6>$ |
| mirror on neutral #17 & #18 | $<2^{20} 5^8 30^{12}> \leftrightarrow <2^{20} 3^8 30^{12}>$ |
| monochromatic (approx.) #11 & #22' | $<3^5 5^7 30^3> \leftrightarrow <3^6 5^8 30^4>$ |

$$\frac{5}{6} \approx \frac{7}{8} \approx \frac{3}{4}$$

The $C_{235}$ colorizing object concept may be applied in other applications. For example, owing to the prosperity of international trade, World Customs Organization (WCO) develops an HS (harmonized system) to classify millions of worldwide merchandises. The current HS classification is a six-digit code displayed on a large text table, hard for customs and users to find target objects from millions of goods. By utilizing $C_{235}$, colors may be assigned to millions of the HS merchandises codes, to help people recognize goods at a glance.

In an alternative example, based on three prime numbers 2, 3 and 5, the prime numbers form a color palettes to colorize a set of objects. The same concept may be applied to form other palettes. Take taste for example, there may be five universally accepted tastes: sweet, salty, sour, bitter, and umami. By using 2, 3, 5, 7, and 11 to represent sweet, salty, sour, bitter, and umami, a taste palette may be formed. Each taste can then be represented uniquely by the production of five prime numbers. This palette could be useful for food industry and chefs. For example, 2×3 (sweet merges salty) may represent a taste of amplifying sweet.

In another example, music harmonic tones are mainly composed of 12 basic pitches on notes, i.e. C, C #, D, . . . , B. By using 2, 3, 5, 7, 11, 13, 17, 19, 23, 29, 31, and 37 to represent C, C #, D, D #, E, F, F #, G, G #, A, A #, and B, respectively, a music palette may be formed, in which all music chords can be represented as a unique number. For example, a C major composed of pitches C, E, G is expressed as uniquely as 2×11×19=418. Such a music palette may be useful for music composer and players.

These embodiments may be advantageous in that a universal color system $C_{235}$ is provided based on prime numbers and Goldbach conjecture. Advantageously, by using smaller amount of prime numbers, $C_{235}$ can assign millions of colors unique numbers, thus to unify current color systems (such as CMYK, RGB, and HS).

Advantageously, color manipulation may be conveniently operated as the calculation of prime numbers, which may allow adjusting colors and predicting the outcome of blending various color lights and color pigments. In addition, $C_{235}$ is also convenient to be expanded to colorize and allocate world-wide objects on a ring.

It will be appreciated that where the methods and systems of the present invention are either wholly implemented by computing system or partly implemented by computing systems then any appropriate computing system architecture may be utilized. This will include stand alone computers, network computers and dedicated hardware devices. Where the terms "computing system" and "computing device" are used, these terms are intended to cover any appropriate arrangement of computer hardware capable of implementing the function described.

For example, in the abovementioned embodiments, features such as the color mapper, the manipulation module, the conversion module, the color fitting module, the color mixer and/or the processing module, may be implemented by or for operation on a computer having an appropriate user interface. The computer may be implemented by any computing architecture, including stand-alone PC, client/server architecture, "dumb" terminal/mainframe architecture, or any other appropriate architecture. The computing device is appropriately programmed to implement the invention. The computer may comprise suitable components necessary to receive, store and execute appropriate computer instructions.

It will also be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A color processing system for converting between color representation systems, comprising:
   a color mapper programmed to map a plurality of colors with a plurality of numerical codes, each of the plurality of numerical codes representing a unique color in a color space, wherein the each of the plurality of numerical codes is a unique integer determined based on a combination of prime numbers, wherein each of the prime numbers represents a respective basic color of the color space, and wherein the plurality of numerical codes are integers calculated based on addition and multiplication of a plurality of prime numbers;
   a processing module comprising one or more processors programmed to process information associated with the plurality of numerical codes; and
   a color renderer functionally connected to the processing module and arranged to render a color based on a signal received from the processing module.

2. The color processing system in accordance with claim 1, wherein the plurality of numerical codes are integers calculated based on Goldbach conjecture.

3. The color processing system in accordance with claim 2, wherein the color space is a CMYK color space, and the basic colors are cyan, magenta, and yellow.

4. The color processing system in accordance with claim 3, wherein the basic colors of cyan, magenta, and yellow are represented by prime numbers of 2, 3, and 5 respectively.

5. The color processing system in accordance with claim 4, wherein a unique color (i) is expressed as Color(i)=$<2^{ci}3^{mi}5^{yi}>^{2.56}$ wherein the color (i) has CMYK values of ($c_i$, $m_i$, $y_i$, $k_i$).

6. The color processing system in accordance with claim 4, wherein the colors of blue, green and red are represented by 6, 10, and 15 respectively, and wherein the colors of blue, green and red are obtained by respectively mixing of: cyan and magenta, cyan and yellow, and magenta and yellow.

7. The color processing system in accordance with claim 6, wherein the colors of cyan-blue, blue-magenta, magenta-red, red-yellow, yellow-green, and green-cyan are represented respectively by 12, 18, 45, 75, 50, and 20.

8. The color processing system in accordance with claim 6, wherein a unique color (i) is expressed as Color(i)= $2^{256-ri}3^{256-gi}5^{256-bi}$, and wherein the color (i) has RGB values of ($r_i$, $g_i$, $b_i$).

9. The color processing system in accordance with claim 8, wherein the integer representing the unique color (i) is specified as Number(i)=$256^2 r_i + 256 g_i + b_i$, where $r_i$, $g_i$, $b_i \in \{0, 1, 2, 3, \ldots, 255\}$.

10. The color processing system in accordance with claim 9, wherein each of $r_i$, $g_i$ and $b_i$ is a sum of two prime numbers if it is an even number.

11. The color processing system in accordance with claim 10, wherein $r_i = \theta_{i1} + d_{i1} + d_{i2}$, $g_i = \theta_{i2} + d_{i3} + d_{i4}$, $b_i = \theta_{i5} + d_{i5} + d_{i6}$, in which $d_{i1}, d_{i2}, d_{i3}, d_{i4}, d_{i5}, d_{i6} \in \rho^{**}$ representing a set of first 33 prime numbers, and $\theta_{i1}, \theta_{i2}, \theta_{i3}$ are binary variables to specify whether $r_i$, $g_i$ and $b_i$ are even or odd.

12. The color processing system in accordance with claim 11, wherein each prime number $d_{il}$ for l=1, 2, . . . , 6 is regarded as a key color.

13. The color processing system in accordance with claim 6, wherein the color mapper is programmed to generate a color palette arranged to represent a plurality of mergers of basic color blocks of (i) cyan, magenta, and yellow and/or (ii) blue, green and red.

14. The color processing system in accordance with claim 13, wherein the color palette comprises 72 CMYK key color blocks represented by 4 groups of key colors corresponding to 18 prime numbers.

15. The color processing system in accordance with claim 14, wherein the 72 CMYK key color blocks are arranged to generate $100^3$ unique colors.

16. The color processing system in accordance with claim 13, wherein the color palette comprises 99 RGB key color blocks represented by 3 groups of key colors corresponding to 33 prime numbers.

17. The color processing system in accordance with claim 16, wherein the 99 RGB key color blocks are arranged to generate $256^3$ unique colors.

18. A method of analysing one or more objects with multiple attributes using the color processing system in accordance with claim 13, comprising the steps of, for each respective one of the one or more objects:
   assigning a unique color for each of a plurality of attributes of the object;
   associating a level of each of the plurality of attributes with an intensity of the unique color;
   allocating the object on the color palette; and
   rendering a color spot representing the object on the color palette.

19. The method of claim 18, further comprising the step of determining at least one relationship among a plurality of objects represented by a plurality of color spots on the color palette.

20. The method of claim 19, wherein the at least one relationship includes a complementary relationship of compared objects indicated by complementary colors on the color palette.

21. The method of claim 19, wherein the at least one relationship includes an approximate relationship of compared objects indicated by monochromatic colors on the color palette.

22. The method of claim 18, wherein the objects includes DNA.

23. The method of claim 22, wherein the plurality of attributes includes protein-binding sites of the DNA.

24. The method of claim 18, further comprising the step of predicting attributes of a resultant object obtained by mixing of multiple objects represented on the color palette.

\* \* \* \* \*